(12) United States Patent
Sato

(10) Patent No.: US 8,125,722 B2
(45) Date of Patent: Feb. 28, 2012

(54) LENS DEVICE

(75) Inventor: Masumi David Sato, Saitama (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 12/878,088

(22) Filed: Sep. 9, 2010

(65) Prior Publication Data

US 2011/0096420 A1    Apr. 28, 2011

(30) Foreign Application Priority Data

Oct. 27, 2009  (JP) ................. P2009-246629

(51) Int. Cl.
 *G02B 7/02*  (2006.01)
(52) U.S. Cl. ........................................ 359/822
(58) Field of Classification Search .......... 359/822
 See application file for complete search history.

(56) References Cited

U.S. PATENT DOCUMENTS

| | | | |
|---|---|---|---|
| 4,088,396 A | 5/1978 | Edelstein | |
| 6,198,580 B1 | 3/2001 | Dallakian | |
| 6,972,910 B2 * | 12/2005 | Orimo et al. | ................. 359/694 |
| 2004/0109243 A1 | 6/2004 | Orimo et al. | |
| 2004/0165830 A1 | 8/2004 | Cote | |
| 2007/0236808 A1 | 10/2007 | Morita | |

FOREIGN PATENT DOCUMENTS

| | | |
|---|---|---|
| JP | 2003-215420 A | 7/2003 |
| JP | 2004-163865 A | 6/2004 |
| JP | 2007-279525 A | 10/2007 |

* cited by examiner

*Primary Examiner* — Ricky Mack
*Assistant Examiner* — Vipin Patel
(74) *Attorney, Agent, or Firm* — Birch, Stewart, Kolasch & Birch, LLP

(57) ABSTRACT

A lens device is capable of simply adjusting the tilt of a lens. A lens holding frame in which a fulcrum portion is tiltably supported by a fulcrum supporting portion is fixed to a lens barrel by tightening a first screw to a first connection portion and a second screw to a second connection portion. The first screw is arranged at a position that is rotated 90° from the fulcrum supporting portion in the clockwise direction, and the second screw is arranged at a position that is rotated 90° from the fulcrum supporting portion in the counterclockwise direction. The first screw is tightened to tilt the lens holding frame about the X-axis, and the second screw is tightened to tilt the lens holding frame about the Y-axis. The amount of tightening of the first and second screws is adjusted to adjust the tilt of a first lens.

4 Claims, 8 Drawing Sheets

LENS DEVICE

CROSS-REFERENCE TO RELATED APPLICATIONS

This application is based upon and claims the benefit of priority from the Japanese Patent Application No. 2009-246629 filed on Oct. 27, 2009; the entire contents of which are incorporated herein by reference.

BACKGROUND OF THE INVENTION

1. Field of the Invention

The present invention relates to a lens device and more particularly, to a lens device having a function of adjusting the tilt of a lens.

2. Description of the Related Art

It is necessary to attach each lens without inclining the lens in order to obtain a desired optical performance of a lens device. Therefore, it is preferable that the lens device have a function of adjusting the tilt of the lens during assembly.

As the lens device having a mechanism for adjusting the tilt of a lens, JP-A-2004-163865 (corresponding to US-A-2004/0109243) discloses a lens device in which adjustment pins are provided on at least three points on the outer circumferential surface of a barrel body and the adjustment pins are rotated to displace a lens holding member in the optical axis direction, thereby adjusting the tilt of a lens.

JP-A-2007-279525 (corresponding to US-A-2007/0236808) discloses a structure in which at least three supporting portions that support a lens holding frame such that the position of the lens holding frame can be changed relative to a barrel body, one of the three supporting portions supports the lens holding frame with a spherical surface, and the other supporting portions support the lens holding frame such that the gap between the lens holding frame and the barrel body can be adjusted, and the tilt of a lens is adjusted by adjusting the gap between the lens holding frame and the barrel body.

However, the tilt of the lens is adjusted as follows. For example, a laser autocollimator is used to detect the tilt of the lens and the tilt of the lens is corrected on the basis of the detection result. The adjustment mechanism according to the related art has a problem in that it takes a long time to calculate the amount of adjustment of each adjustment member (the amount of rotation of each adjustment pin in JP-A-2004-163865 and the gap between the supporting portions in JP-A-2007-279525) and it is necessary to correct the tilt of the lens while performing fine adjustment several times.

SUMMARY OF THE INVENTION

The invention has been made in order to solve the above-mentioned problems and an object of the invention is to provide a lens device capable of simply adjusting the tilt of a lens.

According to a first aspect of the invention, a lens device includes: a lens holding frame holding a lens; a cylindrical barrel; a lens attachment portion with a cylindrical shape which is provided in the barrel and to which the lens holding frame is fitted such that the lens is attached to the barrel; a plurality of protruding portions that is formed on an outer circumferential portion of the lens holding frame so as to protrude therefrom, has a leading end which is contacted with the inner circumferential surface of the lens attachment portion such that the position of the optical axis of the lens holding frame is aligned with the center position of the inner circumference when the lens holding frame is fitted to the lens attachment portion; a fulcrum portion that is formed on the outer circumferential portion of the lens holding frame so as to protrude therefrom; a first connection portion that has a flange shape, protrudes from the outer circumferential portion of the lens holding frame, and is provided at a position which is rotated 90° from the fulcrum portion on the center of the lens holding frame in one direction; a first through hole that is provided in the first connection portion in parallel to the optical axis of the lens; a second connection portion that has a flange shape, protrudes from the outer circumferential portion of the lens holding frame, and is provided at a position which is rotated 90° from the fulcrum portion on the center of the lens holding frame in another direction; a second through hole that is provided in the second connection portion in parallel to the optical axis of the lens; a supporting portion that is provided in the lens attachment portion and supports the fulcrum portion so as to be tiltable; a first screw hole that is provided in an end surface of the lens attachment portion vertical to the optical axis of the lens so as to correspond to the first through hole; a first screw that is inserted into the first screw hole through the first through hole to connect the lens holding frame to the lens attachment portion; a first spring member that has an inner circumferential portion into which the first screw is inserted, is provided between the first connection portion and the end surface of the lens attachment portion, and urges the first connection portion in a direction in which the first connection portion is separated from the end surface of the lens attachment portion; a second screw hole that is provided in the end surface of the lens attachment portion vertical to the optical axis of the lens so as to correspond to the second through hole; a second screw that is inserted into the second screw hole through the second through hole to connect the lens holding frame to the lens attachment portion; and a second spring member that has an inner circumferential portion into which the second screw is inserted, is provided between the second connection portion and the end surface of the lens attachment portion, and urges the second connection portion in a direction in which the second connection portion is separated from the end surface of the lens attachment portion. The amount of tightening of the first screw into the first screw hole and the amount of tightening of the second screw into the second screw hole are adjusted to adjust the tilt of the optical axis of the lens.

According to the above-mentioned aspect of the invention, when the first screw is inserted into the first screw hole, the lens holding frame is tilted about the fulcrum portion supported by the supporting portion according to the amount of tightening of the first screw. Similarly, when the second screw is inserted into the second screw hole, the lens holding frame is tilted about the fulcrum portion supported by the supporting portion according to the amount of tightening of the second screw. The first screw hole is provided at a position that is rotated 90° from the fulcrum portion in one direction, and the second screw hole is provided at a position that is rotated 90° from the fulcrum portion in another direction. Therefore, when the first screw is inserted into the first screw hole, the lens holding frame is tilted about a straight line passing through the fulcrum portion and the second screw hole. When the second screw is inserted into the second screw hole, the lens holding frame is tilted about a straight line passing through the fulcrum portion and the first screw hole. That is, in the invention, the lens holding frame is tilted about two axes orthogonal to each other. In this way, it is possible to simply calculate the amount of adjustment (the amount of tightening) required for tilt adjustment and simply perform the tilt adjustment.

According to a second aspect of the invention, in the lens device according to the first aspect, the fulcrum portion may have a flange shape and protrude from the outer circumferential portion of the lens holding frame. The supporting portion may support the fulcrum portion so as to be tiltable by interposing the fulcrum portion between the spherical surfaces on the front and rear sides.

According to the above-mentioned aspect of the invention, the fulcrum portion protrudes from the outer circumferential portion of the lens holding frame and has a flange shape. The supporting portion supports the fulcrum portion so as to be tiltable by interposing the fulcrum portion between the spherical surfaces on the front and rear sides. In this way, it is possible to accurately support the fulcrum portion so as to be tiltable with a simple structure.

According to a third aspect of the invention, in the lens device according to the first or second aspect, the leading end surface of the protruding portion may have the same curvature as that of the surface of a sphere having the center of the lens holding frame as its center.

According to the above-mentioned aspect, the protruding portion has the same curvature as that of the surface of a sphere having the center of the lens holding frame as its center. In this way, core deviation does not occur and it is possible to accurately tilt the lens holding frame.

According to a fourth aspect of the invention, in the lens device according to any one of the first to third aspects, the protruding portion, the fulcrum portion, the first connection portion, and the second connection portion may be integrally formed in the lens holding frame.

According to the above-mentioned aspect, the protruding portion, the fulcrum portion, the first connection portion, and the second connection portion are integrally formed in the lens holding frame. In this way, it is possible to reduce the number of parts.

According to a fifth aspect of the invention, in the lens device according to any one of the first to fourth aspects, the lens may be a first lens that is attached to the leading end of the barrel.

According to the above-mentioned aspect, the first lens is attached such that the tilt of the first lens can be adjusted. The tilt of the first lens has the greatest effect on the optical performance. Therefore, when the first lens is attached without being tilted, it is possible to manufacture a lens device with stable quality.

According to the above-mentioned aspects of the invention, it is possible to simply adjust the tilt of a lens.

DESCRIPTION OF THE PREFERRED EMBODIMENTS

Hereinafter, a lens device according to an exemplary embodiment of the invention will be described with reference to the accompanying drawings.

<Overall Structure>

Figure 1:
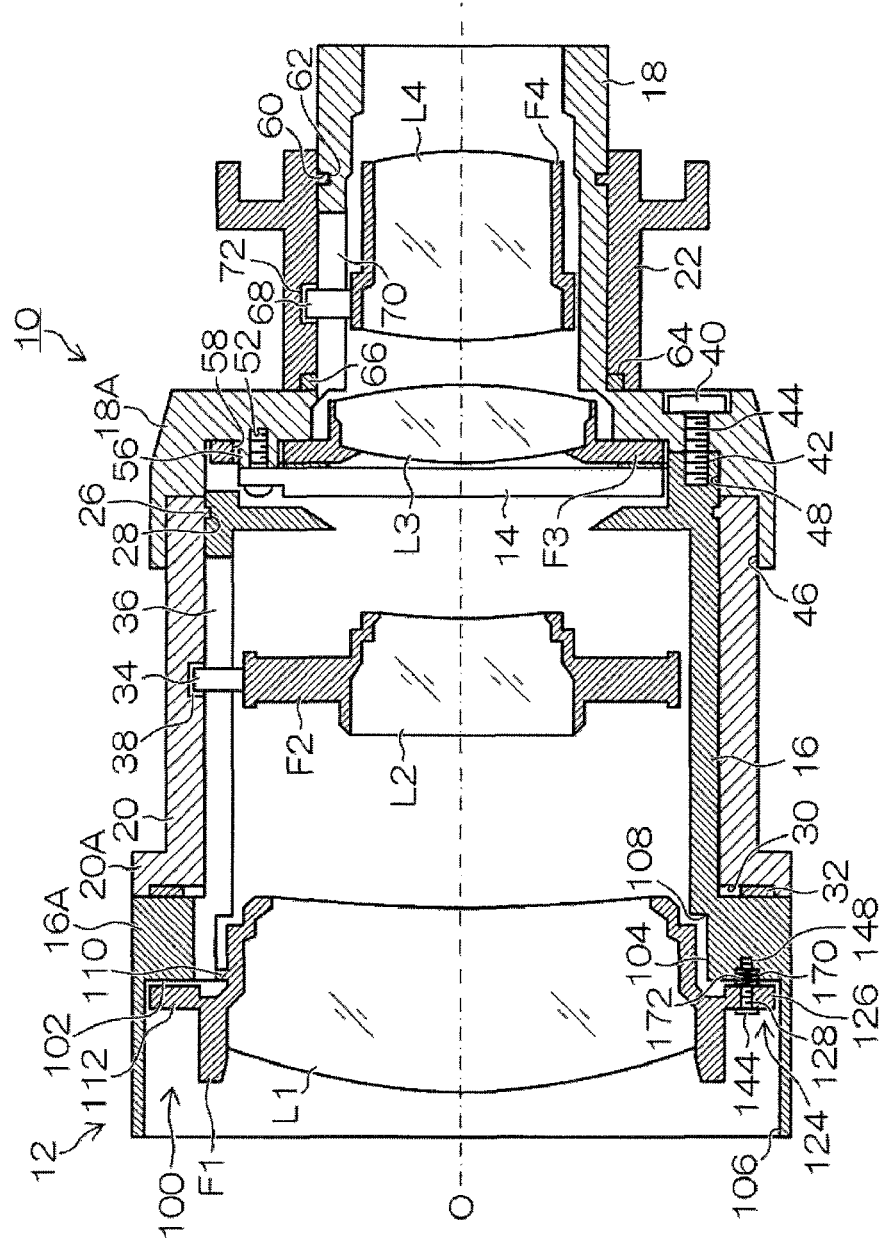
FIG. 1 is a cross-sectional view illustrating a lens device according to an embodiment of the invention.

FIG. 1 is a cross-sectional view illustrating a lens device according to an embodiment of the invention.

A lens device 10 shown in FIG. 1 is for a monitoring camera including a focus mechanism, a zoom mechanism, and an iris mechanism. A first lens L1, a second lens L2, a third lens L3, and a fourth lens L4 are arranged in a lens barrel 12 in this order from the front side along the imaging optical axis O. An iris device 14 is provided between the second lens L2 and the third lens L3.

In FIG. 1, each of the lenses L1 to L4 is a single lens. However, actually, each of the lenses L1 to L4 includes at least one lens.

The first lens L1 and the third lens L3 are fixed lenses and are respectively held by lens holding frames F1 and F3 so as to be fixed and attached to predetermined positions in the lens barrel 12.

The second lens L2 and the fourth lens L4 are moving lenses. The second lens L2 and the fourth lens L4 are respectively held by lens holding frames F2 and F4 and are attached so as to be movable forward or backward along the imaging optical axis O in the lens barrel 12. The lens device 10 moves the second lens L2 to perform a zooming operation and moves the fourth lens L4 to perform a focusing operation.

The lens barrel 12 mainly includes a first fixed cylinder 16, a second fixed cylinder 18 that is coaxially connected to the rear end of the first fixed cylinder 16, a first rotating cylinder 20 that is rotatably provided on an outer circumferential portion of the first fixed cylinder 16, and a second rotating cylinder 22 that is rotatably provided on an outer circumferential portion of the second fixed cylinder 18.

The first fixed cylinder 16 has a cylindrical shape and has a flange portion 16A formed in the outer circumference of the leading end. A lens attachment portion 100 is formed in the inner circumference of the leading end portion of the first fixed cylinder 16, and the first lens L1 is attached to the lens attachment portion 100. The attachment structure of the first lens L1 will be described in detail below.

The first rotating cylinder 20 has a cylindrical shape and has a flange portion 20A formed in the outer circumference of the leading end. The inside diameter of the first rotating cylinder 20 corresponds to the outside diameter of the first fixed cylinder 16. The inner circumferential portion of the first rotating cylinder 20 is fitted to the outer circumferential portion of the first fixed cylinder 16 and is supported such that it can slide on the outer circumferential portion of the first fixed cylinder 16.

Three pins 26 are formed at the rear end of the inner circumferential portion of the first rotating cylinder 20 in the circumferential direction so as to protrude therefrom. The three pins 26 are fitted to a guide groove 28 that is formed at the rear end of the outer circumferential portion of the first fixed cylinder 16 in the circumferential direction. The movement of the first rotating cylinder 20 in the axial direction is regulated by the three pins 26 fitted to the guide groove 28 and the first rotating cylinder 20 is supported so as to be rotatable around the outer circumferential portion of the first fixed cylinder 16.

A ring-shaped concave portion 30 with a predetermined inside diameter which has the imaging optical axis O as its center is formed in the leading end surface of the first rotating cylinder 20. A wavy spring 32 having a ring shape is fitted to the concave portion 30. When the first rotating cylinder 20 is fitted to the outer circumferential portion of the first fixed cylinder 16, the wavy spring 32 comes into contact with the rear end surface of the flange portion 16A of the first fixed cylinder 16 and urges the flange portions 16A and 20A such that they are separated from each other in the axial direction. In this way, when the first rotating cylinder 20 is rotated, a predetermined torque is generated, thereby giving a good operation feeling.

The second lens L2 is accommodated in the inner circumferential portion of the first fixed cylinder 16. Three cam pins 34 are arranged at equal intervals (an interval of 120°) on the outer circumferential portion of the lens holding frame F2 holding the second lens L2. Three straight-ahead grooves 36 to which the three cam pins 34 are individually fitted are formed in the circumferential surface of the first fixed cylinder 16 in parallel to the imaging optical axis O. In addition, three cam grooves 38 to which the three cam pins 34 are individually fitted are formed in the inner circumferential surface of the first rotating cylinder 20 in a predetermined trajectory. The second lens L2 is accommodated in the inner circumferential portion of the first fixed cylinder 16, with the three cam pins 34 fitted to the three straight-ahead grooves 36 formed in the first fixed cylinder 16 and the three cam grooves 38 formed in the inner circumferential surface of the first rotating cylinder 20. In this way, when the first rotating cylinder 20 is rotated, the second lens L2 is moved forward or backward along the imaging optical axis O by the action of the three cam pins 34, the cam grooves 38, and the straight-ahead grooves 36.

The second fixed cylinder 18 has a cylindrical shape and includes a flange portion 18A formed in the outer circumference of the leading end. The second fixed cylinder 18 is coaxially connected to the rear end of the first fixed cylinder 16 by fixing the flange portion 18A to the rear end surface of the first fixed cylinder 16 with barrel fixing screws 40. Therefore, screw holes 42 for the barrel fixing screws 40 are formed in the rear end surface of the first fixed cylinder 16 in parallel to the imaging optical axis O, and holes 44 for the barrel fixing screws 40 are formed in the flange portion 18A of the second fixed cylinder 18 so as to pass through it in parallel to the imaging optical axis O. Three screw holes 42 and three holes 44 are arranged at equal intervals on a concentric circle having the imaging optical axis O as its center. The second fixed cylinder 18 is screwed and fixed to the rear end surface of the first fixed cylinder 16 at three points.

A first fitting portion 46 and a second fitting portion 48 are formed in the leading end surface of the second fixed cylinder 18. The first fitting portion 46 is formed as an annular concave portion having the imaging optical axis O as its center, and the inside diameter of the first fitting portion 46 corresponds to the outside diameter of the first rotating cylinder 20. The second fitting portion 48 is formed as an annular concave portion having the imaging optical axis O as its center in the bottom of the first fitting portion 46, and the inside diameter of the second fitting portion 48 corresponds to the outside diameter of the first fixed cylinder 16. As a result, when the second fixed cylinder 18 is connected to the first fixed cylinder 16, the rear end portion of the first fixed cylinder 16 is fitted to the inside of the second fitting portion 48 and the rear end portion of the first rotating cylinder 20 is fitted to the inside of the first fitting portion 46.

The third lens L3 is fitted to the inside of the second fitting portion 48. When the second fixed cylinder 18 is connected to the first fixed cylinder 16, the lens holding frame F3 is interposed between the rear end surface of the first fixed cylinder 16 and the bottom of the second fitting portion 48 and is fixed to a predetermined position.

In order to reliably fix the lens holding frame F3, a ring-shaped spring member is provided between the lens holding frame F3 and the rear end surface of the first fixed cylinder 16. The spring member presses the lens holding frame F3 against the bottom of the second fitting portion 48.

In order to attach the third lens L3 without being inclined, the rear surface of the lens holding frame F3 of the third lens L3 and the bottom of the second fitting portion 48 are orthogonal to the imaging optical axis O. In this way, when the rear surface of the lens holding frame F3 of the third lens L3 and the bottom of the second fitting portion 48 contact each other, the third lens L3 is arranged orthogonal to the imaging optical axis O.

Bosses (not shown) are provided at two points on the bottom of the second fitting portion 48 so as to protrude in the optical axis direction, and boss holes to which the bosses are fitted are formed in the rear end surface of the lens holding frame F3 of the third lens L3. The third lens L3 is fitted to the second fitting portion 48 by fitting the bosses to the boss holes. In this way, the third lens L3 is positioned and attached.

The iris device 14 is attached to the bottom of the second fitting portion 48 by screws 50. Therefore, screw holes 52 for the screws 50 are formed in the bottom of the second fitting portion 48 in parallel to the imaging optical axis O, and holes (not shown) for the screws 50 are formed in the iris device 14 so as to pass through it in parallel to the imaging optical axis O. Two screw holes 52 and two holes are formed at equal intervals on a concentric circle having the imaging optical axis O as its center, and the iris device 14 is screwed and fixed to the bottom of the second fitting portion 48 at two points.

The screw hole 52 formed in the second fitting portion 48 is provided in a cylindrical protruding portion 56 that protrudes from the bottom of the second fitting portion 48 in parallel to the imaging optical axis O. An insertion hole 58 through which the protruding portion 56 is inserted is formed in the lens holding frame F3 of the third lens L3 in parallel to the imaging optical axis O. The third lens L3 is fitted to the second fitting portion 48 by inserting the protruding portion 56 into the insertion hole 58.

The second rotating cylinder 22 has a cylindrical shape and the inside diameter of the second rotating cylinder 22 corresponds to the outside diameter of the second fixed cylinder 18. The inner circumferential portion of the second rotating cylinder 22 is fitted to the outer circumferential portion of the second fixed cylinder 18. In this way, the second rotating cylinder 22 is supported so as to be slidable on the outer circumferential portion of the second fixed cylinder 18.

Three pins 60 are formed at the rear end of the inner circumferential portion of the second rotating cylinder 22 in the circumferential direction so as to protrude therefrom. The three pins 60 are fitted to guide grooves 62 that are formed at the rear end of the outer circumferential portion of the second fixed cylinder 18 in the circumferential direction. The movement of the second rotating cylinder 22 in the axial direction is regulated by the three pins 60 fitted to the guide grooves 62 and the second rotating cylinder 22 is supported so as to be rotatable around the outer circumferential portion of the second fixed cylinder 18.

A ring-shaped concave portion 64 is formed in the leading end surface of the second rotating cylinder 22 in the circumferential direction. A wavy spring 66 having a ring shape is fitted to the concave portion 64. When the second rotating cylinder 22 is fitted to the outer circumferential portion of the second fixed cylinder 18, the wavy spring 66 comes into contact with the rear end surface of the flange portion 18A of the second fixed cylinder 18 and urges the second rotating cylinder 22 in a direction in which the second rotating cylinder 22 is separated from the flange portion 18A of the second fixed cylinder 18. In this way, when the second rotating cylinder 22 is rotated, a predetermined torque is generated to give a good operation feeling.

The fourth lens L4 is accommodated in the inner circumferential portion of the second fixed cylinder 18. Three cam pins 68 are arranged at equal intervals (an interval of 120°) on the outer circumferential portion of the lens holding frame F4 holding the fourth lens L4. Three straight-ahead grooves 70 to which the three cam pins 68 are individually fitted are formed in the circumferential surface of the second fixed cylinder 18 in parallel to the imaging optical axis O. In addition, three cam grooves 72 to which the three cam pins 68 are individually fitted are formed in the inner circumferential surface of the second rotating cylinder 22 in a predetermined trajectory. The fourth lens L4 is accommodated in the inner circumferential portion of the second fixed cylinder 18, with the three cam pins 68 fitted to the three straight-ahead grooves 70 formed in the second fixed cylinder 18 and the three cam grooves 72 formed in the inner circumferential surface of the second rotating cylinder 22. In this way, when the second rotating cylinder 22 is rotated, the fourth lens L4 is moved forward or backward along the imaging optical axis O by the action of the three cam pins 68, the cam grooves 72, and the straight-ahead grooves 70.

In the lens device 10 having the above-mentioned structure, when the first rotating cylinder 20 is rotated, the second lens L2 is moved forward or backward on the imaging optical axis O according to the amount of rotation. As a result, a zooming operation is performed. In addition, when the second rotating cylinder is rotated, the fourth lens L4 is moved forward or backward on the imaging optical axis O according to the amount of rotation. As a result, a focusing operation is performed.

An imaging unit (not shown) is attached to the rear end portion of the lens device 10. Light incident on the first lens L1 passes through the second lens L2, the iris device 14, the third lens L3, and the fourth lens L4 and is then incident on a light receiving surface of an imaging device provided in the imaging unit.

<Attachment Structure of First Lens L1>

Figure 2:
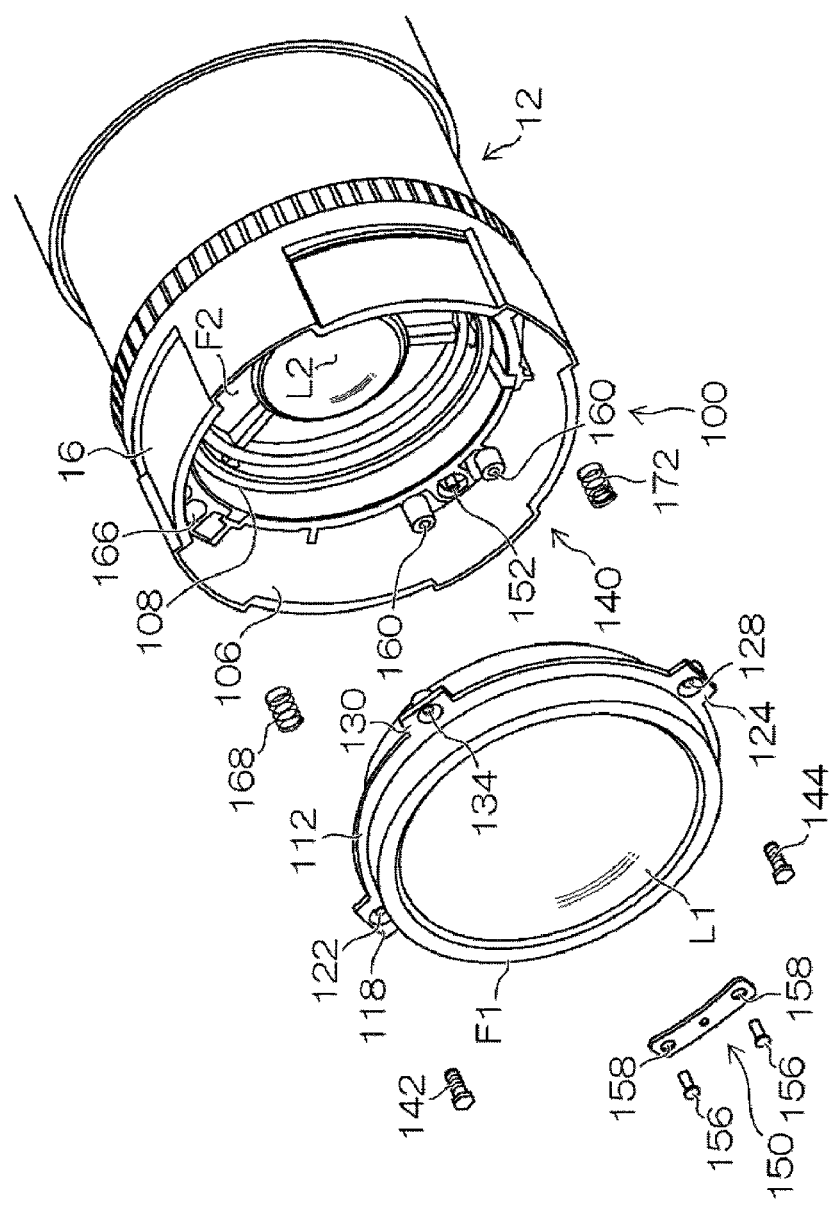
FIG. 2 is an assembly development diagram illustrating a first lens.
Figure 3:
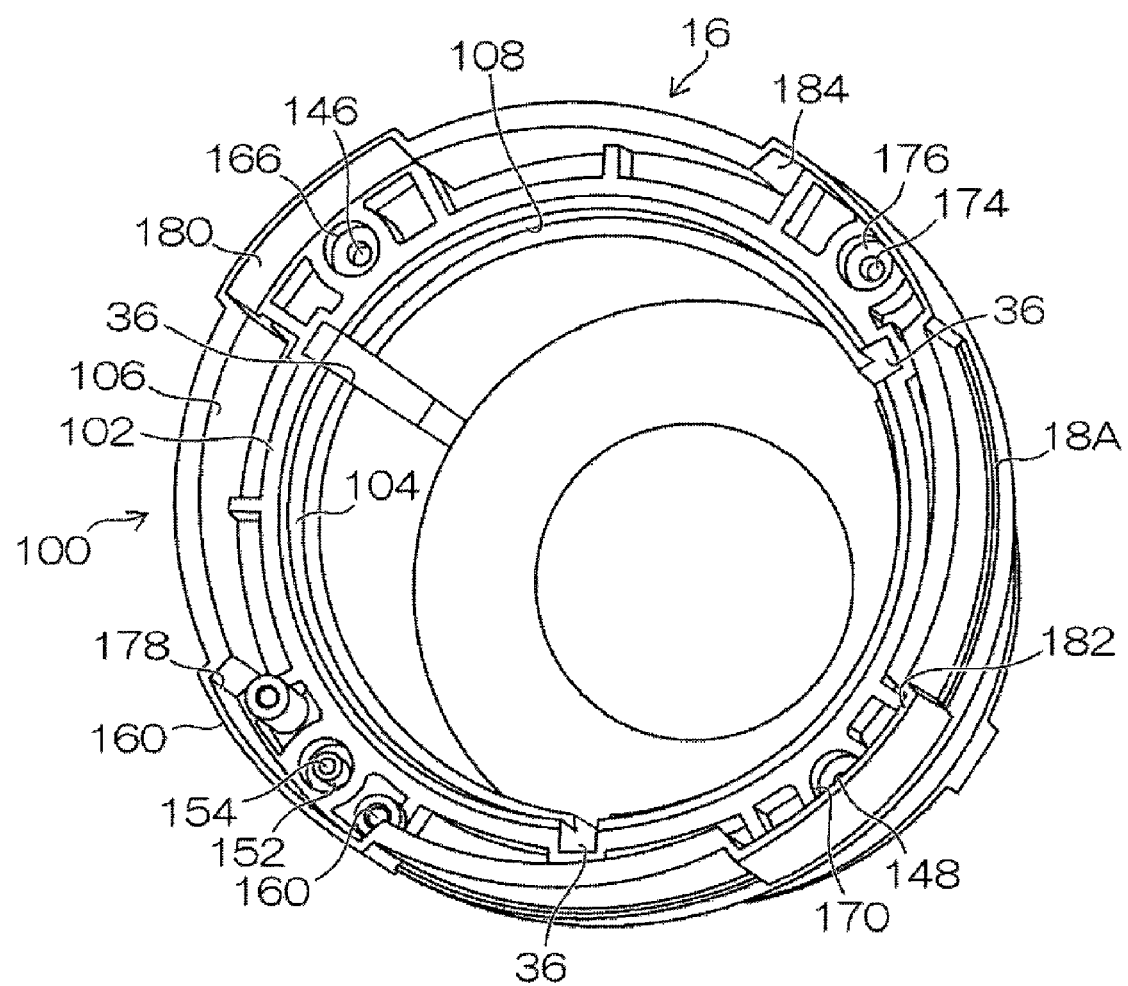
FIG. 3 is a perspective view illustrating a lens attachment portion.
Figure 4:
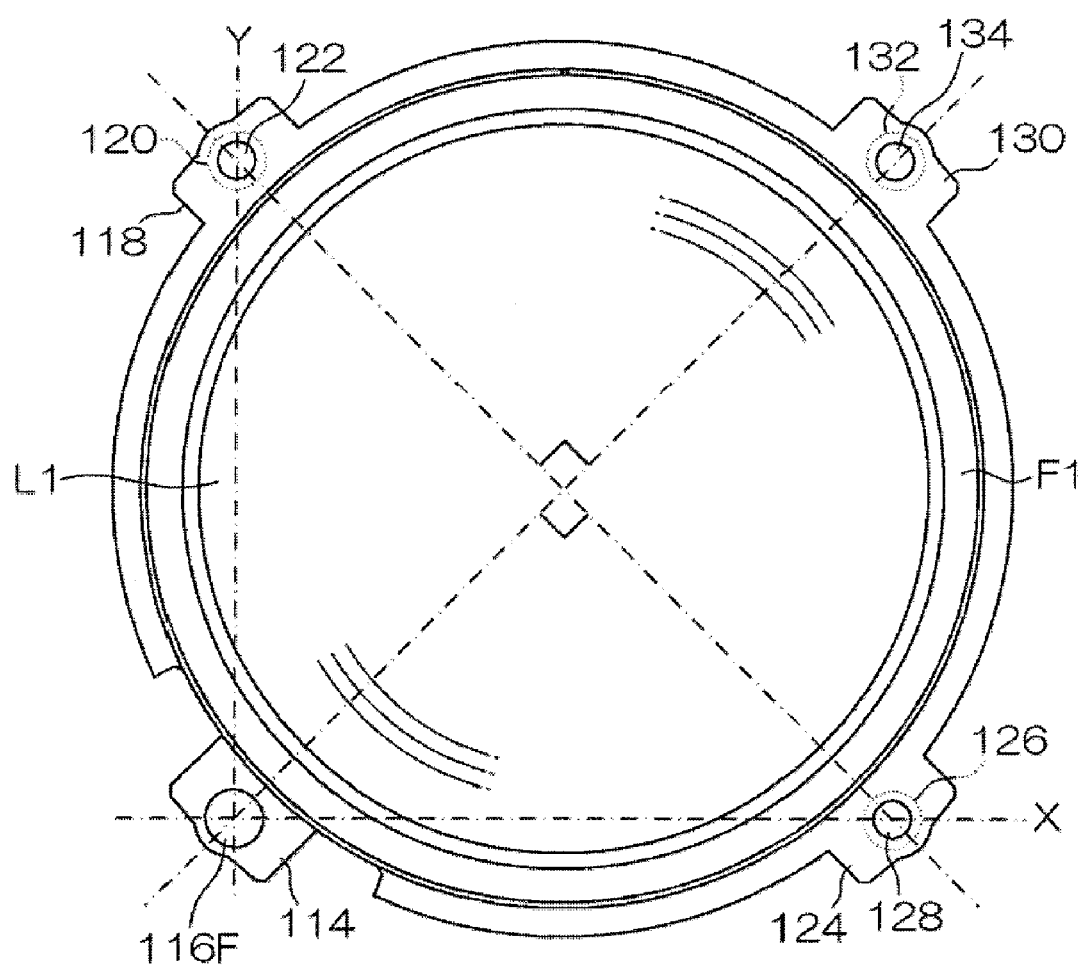
FIG. 4 is a front view illustrating the first lens including a lens holding frame.
Figure 5:
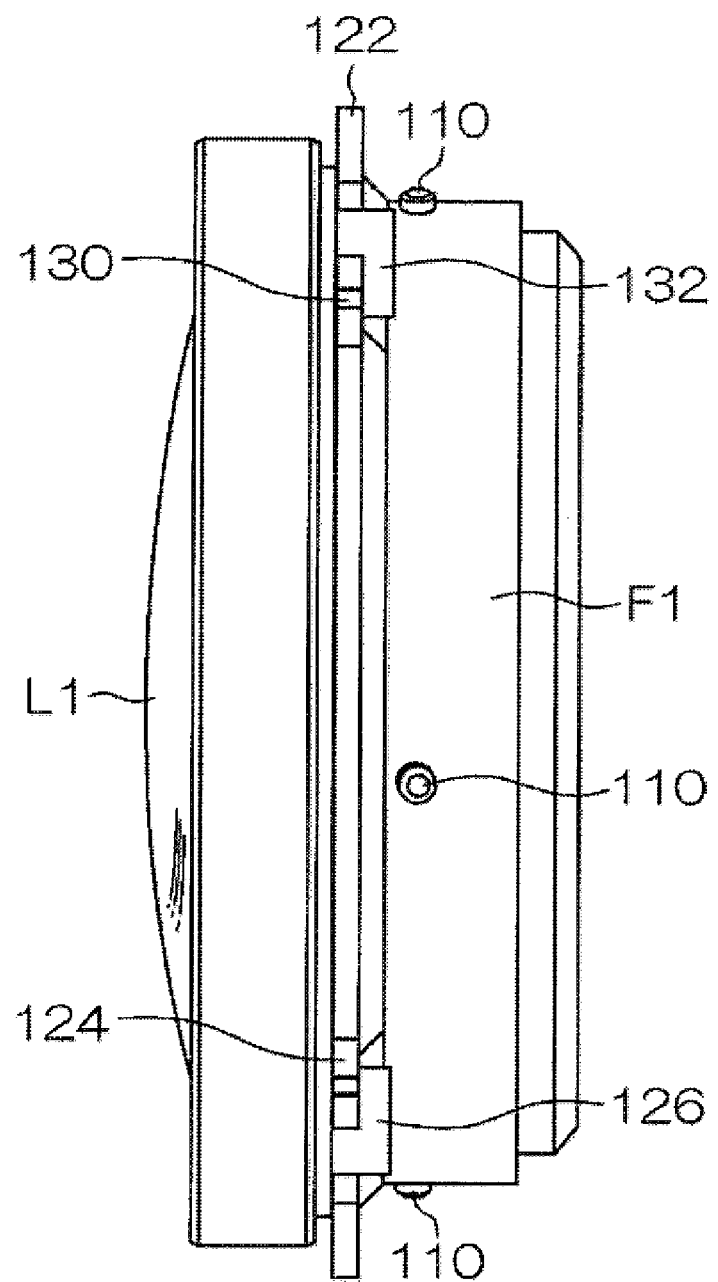
FIG. 5 is a side view illustrating the first lens including the lens holding frame.

FIG. 2 is an assembly development diagram illustrating the first lens L1 and FIG. 3 is a perspective view illustrating a lens attachment portion 100. FIGS. 4 and 5 are a front view and a side view illustrating the first lens including the lens holding frame, respectively.

As described above, the first lens L1 is attached to the lens attachment portion 100 formed in the inner circumference of the leading end of the first fixed cylinder 16. The lens attachment portion 100 includes an attachment reference surface 102 that is formed orthogonal to the imaging optical axis O and an annular guide surface 104 that is provided orthogonal to the attachment reference surface 102.

The first fixed cylinder 16 includes a first annular concave portion 106 that is formed at the leading end thereof and has the imaging optical axis O as its center. The bottom of the first concave portion 106 is the attachment reference surface 102.

A second annular concave portion 108 with a radius r that has the imaging optical axis O as its center is formed in the bottom of the first concave portion 106 and the guide surface 104 is formed as the inner circumferential surface of the second concave portion 108.

Figure 6:
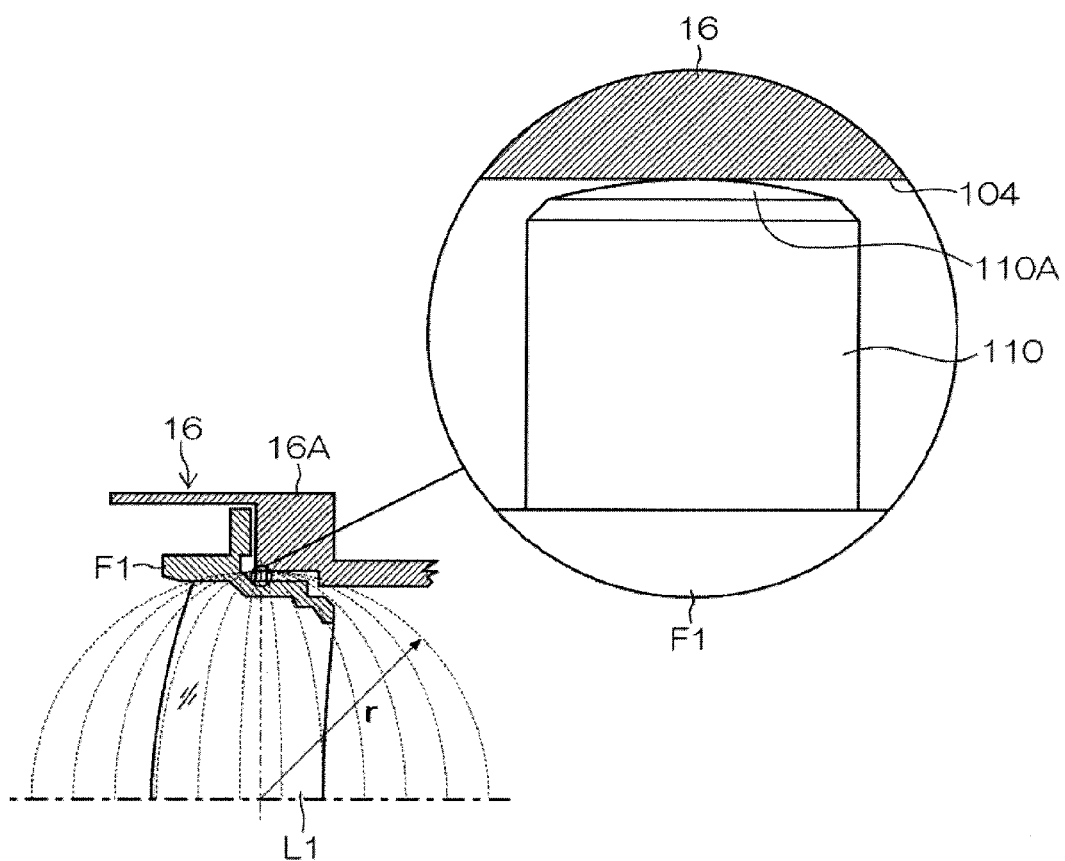
FIG. 6 is an enlarged view illustrating a guide pin.

The first lens L1 is attached to the lens attachment portion 100 by fitting the lens holding frame F1 to the inside of the second concave portion 108. Four guide pins 110 are formed on the outer circumferential portion of the lens holding frame F1 of the first lens L1 so as to protrude in the diametric direction. When the lens holding frame F1 is accommodated in the second concave portion 108, the leading ends of the four guide pins 110 come into contact with the inner circumferential surface (guide surface) 104 of the second concave portion 108, and the lens holding frame F1 is held in the second concave portion 108 with the center thereof (the position of the optical axis of the first lens L1) aligned with the center (the position of the imaging optical axis O) the second annular concave portion 108. The four guide pins 110 are arranged at equal intervals (an interval of 90°) on the same circle having the imaging optical axis O passing through the center of the first lens L1 as its center. As shown in FIG. 6, the leading end surfaces 110A of the four guide pins 110 has the same curvature as the circumferential surface of a sphere with a radius r which has the center of the first lens L1 as its center. As a result, the lens holding frame F1 of the first lens L1 accommodated in the inner circumferential portion of the second concave portion 108 is supported so as to be tiltable with respect to the center of the first lens L1 while the center of the lens holding frame F1 does not deviate from the imaging optical axis O.

A flange portion 112 with a predetermined outside diameter is formed in the outer circumferential portion of the lens holding frame F1 of the first lens L1. A portion of the flange portion 112 is cut out and a fulcrum portion 114 that serves as a fulcrum when the lens holding frame F1 is tilted is formed in the cut-out portion so as to protrude therefrom.

Figure 8:
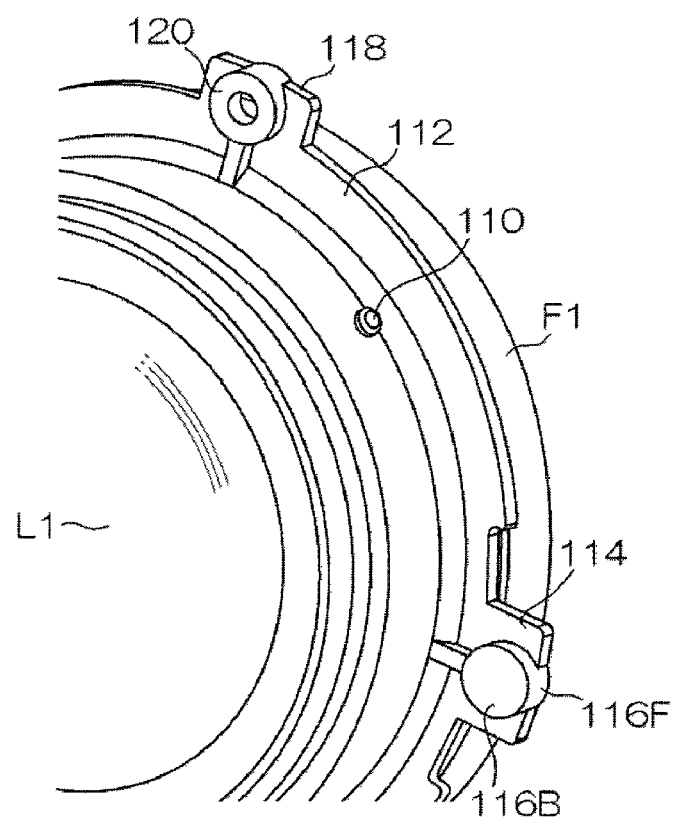
FIG. 8 is an enlarged perspective view illustrating a portion of the lens holding frame.

The fulcrum portion 114 protrudes from the outer circumferential portion of the lens holding frame F1 and has a flange shape. Cylindrical contact portions 116F and 116B are coaxially formed on the front and rear sides of the fulcrum portion 114 so as to protrude in parallel to the imaging optical axis O (see FIG. 8). The end surfaces of the contact portions 116F and 116B serve as the contact surfaces of supporting pins, which will be described below, and are orthogonal to the imaging optical axis O.

A first connection portion 118 is formed at a position that is rotated 90° from the fulcrum portion 114 on the imaging optical axis O in the clockwise direction. The first connection portion 118 protrudes in a flange shape from the outer circumference of the flange portion 112, and a first protruding portion 120 with a cylindrical shape is formed on the rear end surface of the first connection portion 118 in parallel to the imaging optical axis O (see FIG. 8). In addition, a first through hole 122 is coaxially formed in the first protruding portion 120.

A second connection portion 124 is formed at a position that is rotated 90° from the fulcrum portion 114 on the imaging optical axis O in the counterclockwise direction. The second connection portion 124 protrudes in a flange shape from the outer circumference of the flange portion 112, and a second protruding portion 126 with a cylindrical shape is formed on the rear end surface of the second connection portion 124 in parallel to the imaging optical axis O. In addition, a second through hole 128 is coaxially formed in the second protruding portion 126.

A spare supporting portion 130 is formed at a position that is rotated 180° from the fulcrum portion 114 on the imaging optical axis O in the clockwise direction. The spare supporting portion 130 protrudes in a flange shape from the outer circumference of the flange portion 112, and a spare protruding portion 132 with a cylindrical shape is formed on the rear end surface of the spare supporting portion 130 in parallel to the imaging optical axis O. In addition, a spare through hole 134 is coaxially formed in the spare protruding portion 132.

The centers of the contact portions 116F and 116B, the center of first through hole 122, the center of the second through hole 128, and the center of the spare through hole 134 formed in the lens holding frame F1 of the first lens L1 are arranged on a concentric circle having the imaging optical axis O as its center. Therefore, when a straight line Y links the centers of the contact portions 116F and 116B and the center of the first through hole 122 and a straight line X links the centers of the contact portions 116F and 116B and the center of the second through hole 128, the straight line Y and the straight line X are arranged orthogonal to each other.

The first lens L1 is attached to the lens attachment portion 100 by supporting the fulcrum portion 114 with a fulcrum supporting portion 140 formed in the lens attachment portion 100, inserting a first screw 142 and a second screw 144 into a first through hole 122 and a second through hole 128 formed in the first connection portion 118 and the second connection portion 124, and driving the first screw 142 and the second screw 144 into a first screw hole 146 and a second screw hole 148 formed in the lens attachment portion 100, respectively.

The fulcrum supporting portion 140 is supported by interposing the fulcrum portion 114 between an attachment reference surface (the bottom of the first concave portion 106) 102 and a retainer plate 150 attached to a predetermined position of the attachment reference surface 102.

A cylindrical rear supporting pin 152 is provided at a predetermined position of the attachment reference surface 102 so as to protrude in parallel to the imaging optical axis O. A rear contact portion 154 with a semispherical shape is formed on the leading end surface of the rear supporting pin 152 so as to protrude therefrom.

Figure 7:
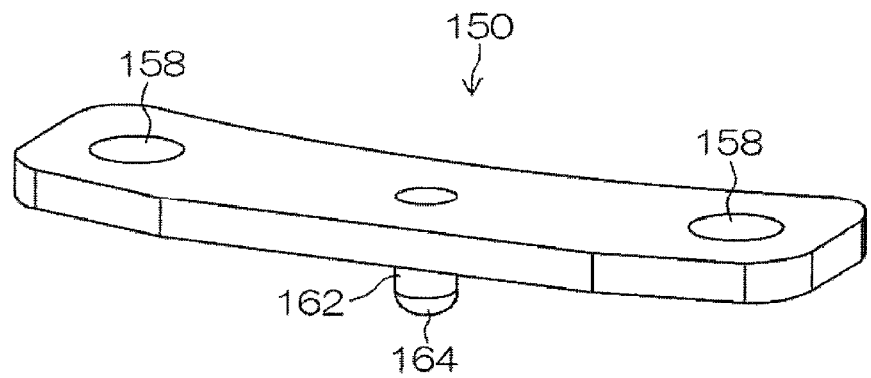
FIG. 7 is a perspective view illustrating a retainer plate.

As shown in FIG. 7, the retainer plate 150 is a blade-shaped plate, and two points of both ends of the retainer plate 150 are attached to the attachment reference surface 102 by retainer plate fixing screws 156. Therefore, holes 158 for the retainer plate fixing screws 156 are formed at both ends of the retainer plate 150. Retainer plate fixing screw holes 160 corresponding to the holes 158 are formed in the attachment reference surface 102. The retainer plate fixing screw holes 160 are symmetrically formed with respect to the rear supporting pin 152 in parallel to the imaging optical axis O.

A cylindrical front supporting pin 162 is provided at the center of the rear surface (a surface facing the attachment reference surface 102 when the retainer plate 150 is attached to the attachment reference surface 102) of the retainer plate 150 so as to vertically protrude therefrom. A front contact portion 164 with a semispherical shape is coaxially formed at the leading end of the front supporting pin 162.

When the retainer plate fixing screws 156 are inserted into the holes 158 to fix the retainer plate 150 to the attachment reference surface 102, the front supporting pin 162 formed on the rear surface of the retainer plate 150 is disposed coaxially with the rear supporting pin 152 formed on the attachment reference surface 102. The front contact portion 164 formed at the leading end of the front supporting pin 162 faces the rear contact portion 154 formed at the leading end of the rear supporting pin 152 with a predetermined gap therebetween. The contact portions 116F and 116B of the fulcrum portion 114 are interposed between the rear contact portion 154 with the rear supporting pin 152 and the front contact portion 164 with the front supporting pin 162. In this way, the lens holding frame F1 of the first lens L1 is tiltably supported.

The first screw hole 146 into which the first screw 142 is inserted through the first through hole 122 is disposed at a position that is rotated 90° from the rear supporting pin 152 on the imaging optical axis O in the clockwise direction. The first screw hole 146 is formed in the bottom of a first accommodation hole 166 formed in the attachment reference surface 102 in parallel to the imaging optical axis O. The first accommodation hole 166 has a cylindrical shape and is formed coaxially with the first screw hole 146. A first coil spring 168 is provided in the first accommodation hole 166. The first screw 142 is inserted into the first screw hole 146 through the inner circumferential portion of the first coil spring 168. As a result, when the first screw 142 is inserted into the first screw hole 146, the first protruding portion 120 is urged by the first coil spring 168 in a direction (to the front side) in which it is separated from the attachment reference surface 102.

The second screw hole 148 into which the second screw 144 is inserted through the second through hole 128 is disposed at a position that is rotated 90° from the rear supporting pin 152 on the imaging optical axis O in the counterclockwise direction. The second screw hole 148 is formed in the bottom of a second accommodation hole 170 formed in the attachment reference surface 102 in parallel to the imaging optical axis O. The second accommodation hole 170 has a cylindrical shape and is formed coaxially with the second screw hole 148. A second coil spring 172 is provided in the second accommodation hole 170. The second screw 144 is inserted into the second screw hole 148 through the inner circumferential portion of the second coil spring 172. As a result, when the second screw 144 is inserted into the second screw hole 148, the second protruding portion 126 is urged by the second coil spring 172 in a direction (to the front side) in which it is separated from the attachment reference surface 102.

A spare screw hole 174 is formed in the attachment reference surface 102 at a position that is rotated 180° from the rear supporting pin 152 on the imaging optical axis O in the clockwise direction. The spare screw hole 174 is formed in the bottom of a spare accommodation hole 176 formed in the attachment reference surface 102 in parallel to the imaging optical axis O. The spare accommodation hole 176 has a cylindrical shape and is formed coaxially with the spare screw hole 174.

As described above, the rear supporting pin 152, the first screw hole 146, the second screw hole 148, and the spare screw hole 174 are formed in the attachment reference surface 102. The rear supporting pin 152, the first screw hole 146, the second screw hole 148, and the spare screw hole 174 are arranged on a concentric circle having the imaging optical axis O as its center and are formed so as to correspond to the contact portions 116F and 116B, the first through hole 122, the second through hole 128, and the spare through hole 134 formed in the lens holding frame F1. Therefore, when the lens holding frame F1 of the first lens L1 is attached to the lens attachment portion 100 with the position of the fulcrum portion 114 aligned with that of the fulcrum supporting portion 140, the position of each through hole is aligned with that of the corresponding screw hole.

Grooves 178, 180, 182, and 184 with predetermined depths and widths are formed in the inner circumferential surface of the first concave portion 106 in parallel to the imaging optical axis O such that the fulcrum portion 114, the first connection portion 118, the second connection portion 124, and the spare supporting portion 130 protruding from the outer circumferential portion of the lens holding frame F1 do not contact when the lens holding frame F1 is attached. The lens holding frame F1 is attached to the lens attachment portion 100 by inserting the leading ends of the fulcrum portion 114, the first connection portion 118, the second connection portion 124, and the spare supporting portion 130 into the grooves 178, 180, 182, and 184.

<Method of Attaching First Lens L1>

Next, a method of attaching the first lens L1 to the lens attachment portion 100 having the above-mentioned structure.

In the lens device 10 according to this embodiment, it is possible to attach the first lens L1 by adjusting tilt.

[Temporary Assembly]

First, a method of temporarily attaching the first lens L1 to the lens barrel 12 will be described.

As described above, the first lens L1 is attached to the lens barrel 12 by attaching the lens holding frame F1 to the lens attachment portion 100 formed in the inner circumferential portion of the leading end of the first fixed cylinder 16.

In this case, first, the first coil spring 168 is put into the first accommodation hole 166 and the second coil spring 172 is put into the second accommodation hole 170.

When the first lens L1 is heavy, the spare coil spring (not shown) is also put into the spare accommodation hole 176. In this embodiment, an example in which the spare coil spring is not used will be described.

Then, the rear end portion of the lens holding frame F1 is fitted into the second concave portion 108. At that time, the lens holding frame F1 is fitted to the second concave portion 108 while aligning the position of the fulcrum portion 114 with the position of the fulcrum supporting portion 140.

In the lens holding frame F1 fitted to the second concave portion 108, the leading ends of the four guide pins 110 formed so as to protrude from the outer circumferential surface come into contact with the inner circumferential surface (guide surface) 104 of the second concave portion 108. In this way, the optical axis of the first lens L1 is arranged on the imaging optical axis O. In addition, the first lens L1 is guided by the leading end surfaces of the guide pins 110 and is tiltably supported.

Then, the first screw 142 is inserted into the first screw hole 146 through the first through hole 122 formed in the first connection portion 118. Similarly, the second screw 144 is inserted into the second screw hole 148 through the second through hole 128 formed in the second connection portion 124. In this way, the lens holding frame F1 is temporarily fixed to the lens barrel 12.

The first coil spring 168 and the second coil spring 172 are respectively put into the first accommodation hole 166 and the second accommodation hole 170, and the temporarily fixed lens holding frame F1 is temporarily fixed to the lens barrel 12 while being urged to the front side by the first coil spring 168 and the second coil spring 172.

Then, the retainer plate 150 is attached. The retainer plate 150 is arranged on the fulcrum portion 114 while aligning the positions of the holes 158 with the positions of the retainer plate fixing screw holes 160 and is then attached to the attachment reference surface 102 by two retainer plate fixing screws 156.

When the retainer plate 150 is attached, the fulcrum portion 114 of the lens holding frame F1 is interposed between the front supporting pin 162 formed on the rear surface of the retainer plate 150 and the rear supporting pin 152 formed on the attachment reference surface 102.

In this way, the temporary attachment of the first lens L1 is completed. Then, the tilt of the optical axis of the first lens L1 is adjusted.

[Adjustment of Tilt]

Figure 9:
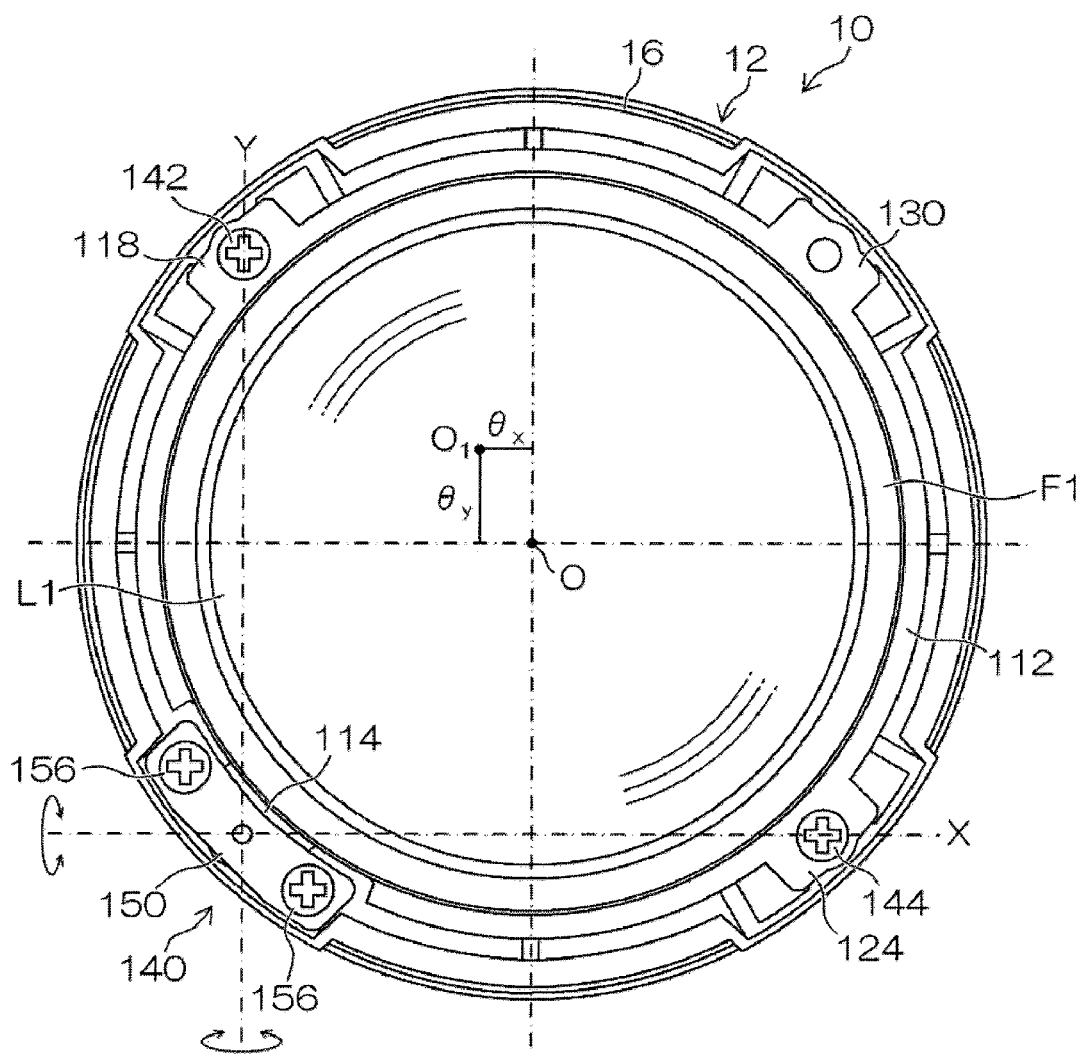
FIG. 9 is a front view illustrating a lens barrel to which the first lens is temporarily attached.

FIG. 9 is a front view illustrating the lens barrel 12 to which the first lens L1 is temporarily attached.

The temporarily attached first lens L1 is supported by one point of the fulcrum portion 114 with respect to the lens barrel 12. The fulcrum portion 114 is supported while being interposed between the front supporting pin 162 having a semispherical leading end and the rear supporting pin 152. Therefore, the first lens L1 is supported so as to be tiltable on a portion interposed between the front supporting pin 162 and the rear supporting pin 152.

The first lens L1 is temporarily fixed to the lens barrel 12 by the first screw 142 and the second screw 144 while being urged to the front side by the first coil spring 168 and the second coil spring 172. As a result, the first lens L1 is tilted according to the amount of tightening of the first screw 142 and the second screw 144 that temporarily fix the first lens L1.

When the first screw 142 is tightened, the first lens L1 is tilted about the X-axis. When the second screw 144 is tightened, the first lens L1 is tilted about the Y-axis. That is, it is possible to tilt the first lens L1 about two axes orthogonal to each other.

The assembler adjusts the amount of tightening of the first screw 142 and the second screw 144 to adjust the tilt of the first lens L1. Next, a detailed example of the adjustment method will be described.

For example, a laser autocollimator is used to detect the tilt of the optical axis $O_1$ of the first lens L1 in the lens device 10 to which the first lens L1 is temporarily attached. The tilt is generally detected as a tilt θy about the X-axis and a tilt θx about the Y-axis.

The tilt θy about the X-axis is corrected by tilting the first lens L1 about the X-axis, and the tilt θx about the Y-axis is corrected by tilting the first lens L1 about the Y-axis.

As described above, the first screw 142 is tightened to tilt the first lens L1 about the X-axis, and the second screw 144 is tightened to tilt the first lens L1 about the Y-axis.

Therefore, the assembler adjusts the amount of tightening of the first screw 142 and the second screw 144 on the basis of the detection result of the tilt, thereby correcting the tilt of the first lens L1. That is, the assembler tightens the first screw 142 to tilt the first lens L1 about the X-axis such that the tilt θy about the X-axis is corrected, on the basis of the detection result of the tilt. Similarly, the assembler tightens the second screw 144 to tilt the first lens L1 about the Y-axis such that the tilt θx about the Y-axis is corrected, on the basis of the detection result of the tilt. In this way, the tilt of the first lens L1 is corrected.

Then, the lens holding frame F1 is adhered to the first fixed cylinder 16 by an adhesive. In this way, the first lens L1 whose tilt is corrected is fixed so as not to move.

As described above, according to the lens device 10 of this embodiment, the first lens L1 is supported so as to be tiltable about two axes (X-Y) orthogonal to each other. The first screw 142 and the second screw 144 are tightened to tilt the first lens L1 about two axes orthogonal to each other. Therefore, it is possible to easily obtain the amount of correction from the detection result of the tilt obtained by, for example, a laser autocollimator and simply correct the tilt.

In the lens device 10 according to this embodiment, the fulcrum portion 114 is interposed between the front supporting pin 162 having a semispherical leading end and the rear supporting pin 152 such that the lens holding frame F1 is tiltably supported. Therefore, a positional deviation is less likely to occur due to an impact and it is possible to accurately tilt the lens holding frame F1.

In this embodiment, the four guide pins 110 provided so as to protrude from the outer circumferential portion of the lens holding frame F1 hold the first lens L1 on the imaging optical axis O. Therefore, it is possible to tilt the first lens L1 without the deviation between the center of the first lens L1 and the imaging optical axis O. In particular, in the lens device 10 according to this embodiment, the leading end of each of the guide pins 110 has the same curvature as that of the circumferential surface of a sphere with a radius r having the center of the first lens L1 as its center. Therefore, it is possible to accurately tilt the first lens L1.

In this embodiment, four guide pins 110 are provided on the outer circumferential portion of the lens holding frame F1. However, the number of guide pins 110 is not limited thereto. At least three guide pins may be provided on the outer circumferential portion of the lens holding frame F1 to hold the center of the first lens L1 on the imaging optical axis O. In this case, it is preferable that the guide pins be arranged at equal intervals on the outer circumferential portion of the lens holding frame F1.

In this embodiment, the four guide pins 110 are provided. It is preferable that the four guide pins 110 be arranged at the middle position between the fulcrum portion 114 and the first connection portion 118, the middle position between the first connection portion 118 and the spare supporting portion 130, the middle position between the spare supporting portion 130 and the second connection portion 124, and the middle position between the second connection portion 124 and the fulcrum portion 114, respectively. In this way, it is possible to stably support the first lens.

As described above, the spare supporting portion 130 is a spare portion used when the first lens L1 is heavy. Therefore, when the first lens L1 can be stably supported by the first connection portion 118 and the second connection portion 124, the spare supporting portion 130 may be omitted. In addition, when the first lens L1 is heavy, the spare supporting portion 130 is held by the spare coil spring in the spare accommodation hole 176. In this way, it is possible to stably support the first lens L1.

It is preferable that each component of the lens holding frame F1 be integrally formed of, for example, a resin material. In this way, it is possible to reduce the number of components and the number of assembly processes.

In this embodiment, the invention is applied to the attachment of the first lens L1. However, the invention may be applied to the attachment of other lenses.

The optical performance of the first lens attached to the leading end of the lens barrel is greatly affected by the tilt of the optical axis. Therefore, when the invention is applied to accurately attach the first lens, it is possible to stably manufacture a high-accuracy lens device.

In this embodiment, the invention is applied to the lens device for a monitoring camera. However, the invention may be applied to other lens devices.

What is claimed is:

1. A lens device comprising:
   a lens holding frame holding a lens;
   a cylindrical barrel;
   a lens attachment portion with a cylindrical shape which is provided in the barrel and to which the lens holding frame is fitted such that the lens is attached to the barrel;
   a plurality of protruding portions that are formed on an outer circumferential portion of the lens holding frame so as protrude therefrom, and have a leading end which is contacted with the inner circumferential surface of the lens attachment portion such that the position of the optical axis of the lens holding frame is aligned with the center position of the inner circumference when the lens holding frame is fitted to the lens attachment portion;
   a fulcrum portion that is formed on the outer circumferential portion of the lens holding frame so as to protrude therefrom;
   a first connection portion that has a flange shape, protrudes from the outer circumferential portion of the lens holding frame, and is provided at a position which is rotated 90° from the fulcrum portion on the center of the lens holding frame in one direction;
   a first through hole that is provided in the first connection portion in parallel to the optical axis of the lens;
   a second connection portion that has a flange shape, protrudes from the outer circumferential portion of the lens holding frame, and is provided at a position which is rotated 90° from the fulcrum portion on the center of the lens holding frame in another direction;
   a second through hole that is provided in the second connection portion in parallel to the optical axis of the lens;
   a supporting portion that is provided in the lens attachment portion and supports the fulcrum portion so as to be tiltable;
   a first screw hole that is provided in an end surface of the lens attachment portion vertical to the optical axis of the lens so as to correspond to the first through hole;
   a first screw that is inserted into the first screw hole through the first through hole to connect the lens holding frame to the lens attachment portion;
   a first spring member that has an inner circumferential portion into which the first screw is inserted, is provided between the first connection portion and the end surface of the lens attachment portion, and urges the first connection portion in a direction in which the first connection portion is separated from the end surface of the lens attachment portion;
   a second screw hole that is provided in the end surface of the lens attachment portion vertical to the optical axis of the lens so as to correspond to the second through hole;
   a second screw that is inserted into the second screw hole through the second through hole to connect the lens holding frame to the lens attachment portion; and
   a second spring member that has an inner circumferential portion into which the second screw is inserted, is provided between the second connection portion and the end surface of the lens attachment portion, and urges the second connection portion in a direction in which the second connection portion is separated from the end surface of the lens attachment portion,
   wherein the amount of tightening of the first screw into the first screw hole and the amount of tightening of the second screw into the second screw hole are adjusted to adjust the tilt of the optical axis of the lens;
   wherein the leading edge surface of the protruding portions has this same curvature as that of the surface of a sphere having the center of the lens holding frame at center.

2. The lens device according to claim 1,
   wherein the fulcrum portion has a flange shape and protrudes from the outer circumferential portion of the lens holding frame, and
   the supporting portion supports the fulcrum portion so as to be tiltable by interposing the fulcrum portion between spherical surfaces on the front and rear sides.

3. The lens device according to claim 1,
   wherein the protruding portion, the fulcrum portion, the first connection portion, and the second connection portion are integrally formed in the lens holding frame.

4. The lens device according to claim 1,
   wherein the lens is a first lens that is attached to the leading end of the barrel.

* * * * *